United States Patent
Conway

(10) Patent No.: US 8,842,544 B2
(45) Date of Patent: Sep. 23, 2014

(54) TRAP-FREE SHORTEST LINK-AND-SHARED RISK LINK GROUP-DISJOINT PATHS

(75) Inventor: Adrian E. Conway, Weston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 316 days.

(21) Appl. No.: 13/223,474

(22) Filed: Sep. 1, 2011

(65) Prior Publication Data

US 2012/0213080 A1  Aug. 23, 2012

Related U.S. Application Data

(63) Continuation-in-part of application No. 13/029,337, filed on Feb. 17, 2011.

(51) Int. Cl.
*H04L 12/26* (2006.01)
*H04L 12/24* (2006.01)
*H04L 12/735* (2013.01)

(52) U.S. Cl.
CPC .............. *H04L 41/12* (2013.01); *H04L 45/128* (2013.01)
USPC ......................................................... 370/238

(58) Field of Classification Search
CPC .................................................... H04L 45/128
USPC ................. 370/216, 225, 228, 229, 235, 238; 709/238, 239, 242
See application file for complete search history.

(56) References Cited

U.S. PATENT DOCUMENTS

| | | | | |
|---|---|---|---|---|
| 4,912,656 A | * | 3/1990 | Cain et al. | 709/242 |
| 5,577,030 A | * | 11/1996 | Oki et al. | 370/351 |
| 6,804,199 B1 | * | 10/2004 | Kelly et al. | 370/238 |
| 6,996,065 B2 | * | 2/2006 | Kodialam et al. | 370/238 |
| 7,352,703 B2 | * | 4/2008 | Elie-Dit-Cosaque et al. | 370/237 |
| 7,397,761 B2 | * | 7/2008 | Kar et al. | 370/225 |
| 7,451,340 B2 | * | 11/2008 | Doshi et al. | 714/47.2 |
| 7,643,408 B2 | * | 1/2010 | Atkinson et al. | 370/217 |
| 7,701,848 B2 | * | 4/2010 | Qiao et al. | 370/228 |
| 8,027,245 B2 | * | 9/2011 | Kodialam et al. | 370/216 |
| 8,135,026 B2 | * | 3/2012 | Khandekar | 370/431 |
| 8,144,626 B2 | * | 3/2012 | Zhang et al. | 370/255 |
| 8,223,651 B2 | * | 7/2012 | Kano | 370/238 |
| 8,284,758 B2 | * | 10/2012 | Shah et al. | 370/351 |
| 8,396,066 B1 | * | 3/2013 | Banerjee et al. | 370/392 |

(Continued)

OTHER PUBLICATIONS

Wang, Yan et al. (2009 Publication; New SRLG-diverse path selection algorithm in GMPLS networks).*

(Continued)

*Primary Examiner* — Chi Pham
*Assistant Examiner* — Robert Lopata

(57) ABSTRACT

A method including receiving network graph information of a network, wherein the network graph information includes shared risk link group (SRLG) information; determining a maximum link-and-SRLG-disjoint flow value of the network based on the network graph information; selecting a value for a number of trap-free shortest link-and-SRLG-disjoint paths to find between a source node and a destination node based on the maximum link-and-SRLG-disjoint flow value; selecting a minimum remaining link-and-SRLG-disjoint flow value based on the value for the number of trap-free shortest link-and-SRLG-disjoint paths; and selecting a trap-free shortest link-and-SRLG-disjoint path in which a complementary part of the network supports at least the minimum remaining link-and-SRLG-disjoint-flow value.

20 Claims, 15 Drawing Sheets

(56) References Cited

U.S. PATENT DOCUMENTS

| | | | |
|---|---|---|---|
| 2003/0224796 A1* | 12/2003 | Landes et al. | 455/446 |
| 2003/0227877 A1* | 12/2003 | Kar et al. | 370/252 |
| 2005/0237950 A1* | 10/2005 | Yuan et al. | 370/255 |
| 2009/0245136 A1* | 10/2009 | Kano | 370/254 |
| 2010/0329120 A1* | 12/2010 | Zhang et al. | 370/238 |
| 2011/0080846 A1* | 4/2011 | He et al. | 370/254 |
| 2012/0044811 A1* | 2/2012 | White et al. | 370/238 |

OTHER PUBLICATIONS

Ajay, Todimala et al. (2004 Publication; An iterative heuristic for SRLG Diverse Routing in Mesh networks).*

Teresa, Gomes et al. (2010 Publication; Obtaining SRLG-Disjoint Path Pair of Min Cost).*

Hassan Naser et al. (2006 Publication; Link-Disjoint Shortest Delay Path Pair Computation Algorithms.)*

Taku Kihara et al. (2008 Publication; Fast Link-Disjoint Path Algorithm).*

Johnathan Whalen et al. (2007 Publication Finding Maximal Link Disjoint Paths in Multigraph).*

Eiji Oki et al. In publication titled: "Disjoint Path Selection Scheme with SRLG in GMPLS Networks". Published at High Performance Switching and Routing, 2002.*

Bertsekas, et al., "Data Networks (Second Edition), Chapter 5: Routing in Data Networks", Bertsekas, et al., "Data Networks (Second Edition), Chapter 5: Routing in Data Networks," ISBN 0132009161, p. 396, Copyright 1992.

Dunn, et al., "Comparison of k-Shortest Paths and Maximum Flow Routing for Network Facility Restoration", Dunn et al., "Comparison of k-Shortest Paths and Maximum Flow Routing for Network Facility Restoration," IEEE Journal on Selected Areas in Communications, vol. 12, Issue 1, pp. 88-99, Jan. 1994.

German, et al., "On the Challenges of Finding Two Link-disjoint Lightpaths of Minimum Total Weight Across an Optical Network", German, "On the Challenges of Finding Two Link-disjoint Lightpaths of Minimum Total Weight Across an Optical Network," In Proceedings of 14th European Conference on Networks and Optical Communications (NOC 2009), pp. 217-224, Jun. 10-12, 2009.

Lee, et al., "Diverse Routing in Networks With Probabilistic Failures", Lee, et al., "Diverse Routing in Networks With Probabilistic Failures," IEEE/ACM Transactions on Networking, vol. 18, Issue 6, pp. 1895-1907, Dec. 2010.

Macgregor, et al., "Optimized k-shortest-paths Algorithm for Facility Restoration", Macgregor, et al., "Optimized k-shortest-paths Algorithm for Facility Restoration," Software Practice and Experience, vol. 24, Issue 9. pp. 823-834, Sep. 1994.

Rohrer, et al., "Path Diversification: A Multipath Resilience Mechanism", Rohrer, et al., "Path Diversification: A Multipath Resilience Mechanism," 7th International Workshop on Design of Reliable Communication Networks, (DRCN 2009), pp. 343-351, Oct. 25-28, 2009.

She, et al., "How Reliable Can Two-Path Protection Be?", She, et al, "How Reliable Can Two-Path Protection Be?," IEEE/ACM Transactions on Networking, vol. 18, Issue 3, pp. 922-933, Jun. 2010.

Suurballe, et al., "A Quick Method for Finding Shortest Pairs of Disjoint Paths", Suurballe, et al., "A Quick Method for Finding Shortest Pairs of Disjoint Paths," Networks, vol. 14, pp. 325-336, Copyright 1984.

Suurballe, "Disjoint Paths in a Network", Suurballe, "Disjoint Paths in a Network," Networks, vol. 4, Issue 2, pp. 125-145, Copyright 1974.

Xiao, et al., "Constrained Shortest Link-Disjoint Paths Selection: A Network Programming Based Approach", Xiao, et. al., "Constrained Shortest Link-Disjoint Paths Selection: A Network Programming Based Approach," IEEE Transactions on Circuits and Systems—I: Regular Papers, vol. 53, Issue 5, pp. 1174-1187, May 2006.

Xu, et al., "On Finding Disjoint Paths in Single and Dual Link Cost Networks", Xu, et al., "On Finding Disjoint Paths in Single and Dual Link Cost Networks," Twenty-third Annual Joint Conference of the IEEE Computer and Communications Societies (INFOCOM 2004), vol. 4, pp. 705-715, Mar. 7-11, 2004.

Xu, et al., "On the Complexity of and Algorithms for Finding the Shortest Path with a Disjoint Counterpart", Xu, et al., "On the Complexity of and Algorithms for Finding the Shortest Path with a Disjoint Counterpart," IEEE/ACM Transactions on Networking, vol. 14, Issue 1, pp. 147-158, Feb. 2006.

Zhang, et al., "On the Complexity and Approximation of the Min-Sum and Min-Max Disjoint Paths Problems", Zhang, et al, "On the Complexity and Approximation of the Min-Sum and Min-Max Disjoint Paths Problems," ESCAPE 2007, Lecture Notes in Computer Science, vol. 4614, pp. 70-81, Copyright 2007.

* cited by examiner

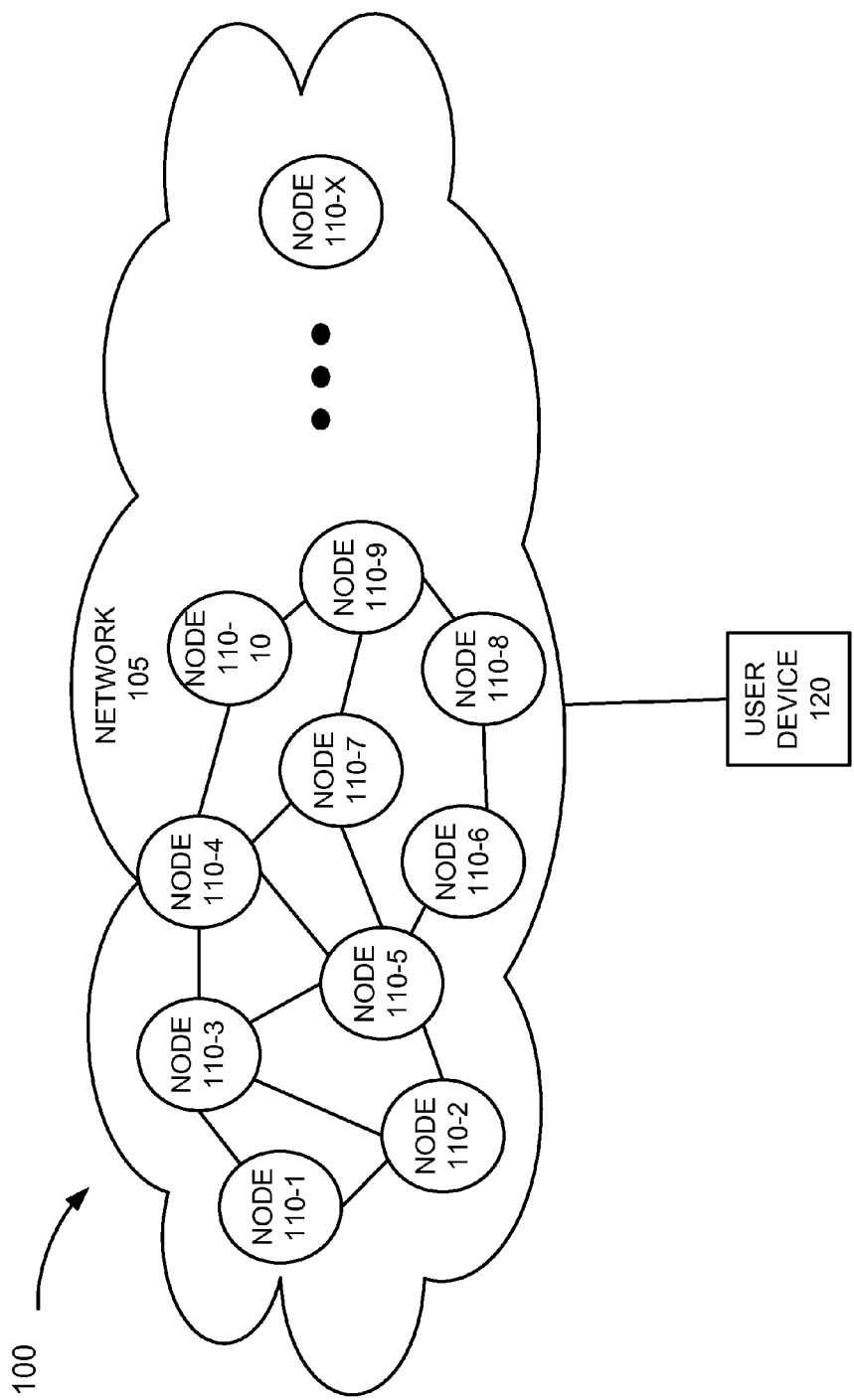

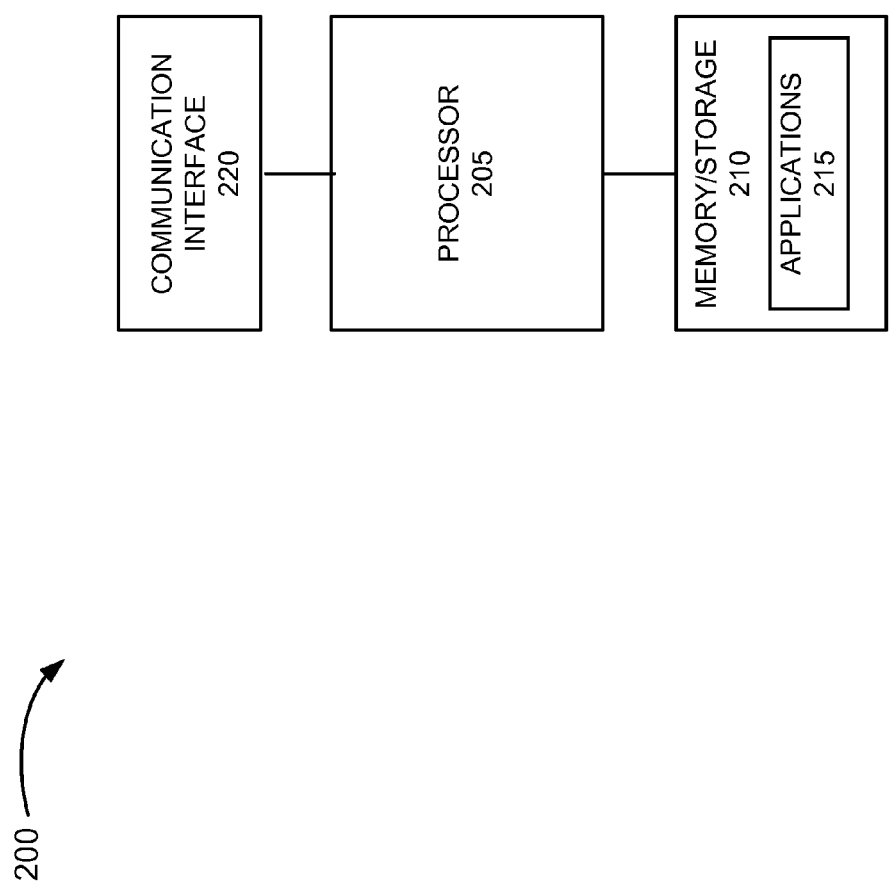

| $i$ | $E_{S,T}^h(i,2)$ | $Q_{S,T}^h(i,2)$ |
|---|---|---|
| S | 0 | |
| A | 1 | S-A |
| B | 1.1 | S-B |
| C | 1 | S-C |
| T | 2 | S-A-T |

$h=3$

| $i$ | h=1 | | h=2 | |
|---|---|---|---|---|
| | $E_{S,T}^h(i,1)$ | $Q_{S,T}^h(i,1)$ | $E_{S,T}^h(i,1)$ | $Q_{S,T}^h(i,1)$ |
| S | 0 | | 0 | |
| A | | | | |
| B | 1.1 | S-B | 1.1 | S-B |
| C | 1 | S-C | 1 | S-C |
| T | 3 | S-T | 2.1 | S-B-T |

Fig. 5E

| $i$ | $h=3$ | |
|---|---|---|
| | $E^h_{S,T}(i,1)$ | $Q^h_{S,T}(i,1)$ |
| S | 0 | |
| A | | |
| B | 1.1 | S-B |
| C | 1 | S-C |
| T | 2.1 | S-B-T |

US 8,842,544 B2

TRAP-FREE SHORTEST LINK-AND-SHARED RISK LINK GROUP-DISJOINT PATHS

CROSS REFERENCE TO RELATED APPLICATIONS

This application is a continuation-in-part of U.S. application Ser. No. 13/029,337 filed on Feb. 17, 2011, the disclosure of which is hereby incorporated by reference herein in its entirety.

BACKGROUND

As network operators and service providers strive to provide new or improved services and/or assets to users, network requirements may correspondingly increase. As a result, network operators and service providers must confront a host of challenges to ensure that quality of service (QoS) and other performance metrics are maintained. For example, one challenge confronted by network operators and service providers is to ensure that service is not degraded or minimally degraded due to failures in the network.

BRIEF DESCRIPTION OF THE DRAWINGS

FIG. 1 is a diagram illustrating an exemplary environment in which an exemplary embodiment for determining and using trap-free K shortest link-and-Shared Risk Link Group (SRLG)-disjoint paths may be implemented;

FIG. 2 is a diagram illustrating exemplary components of a device that may correspond to one or more devices in the exemplary environment depicted in FIG. 1;

FIGS. 5E and 5F are diagrams illustrating exemplary tables that include the total lengths $E_{s,t}^{h}(i,f)$ of the set of h links in $Q_{s,t}^{h}(i,f)$ and the set of links in the shortest h-hop path $Q_{s,t}^{h}(i,f)$ pertaining to a discovery of a second shortest link-and-SRLG-disjoint path;

DETAILED DESCRIPTION OF PREFERRED EMBODIMENTS

Figure 3A:
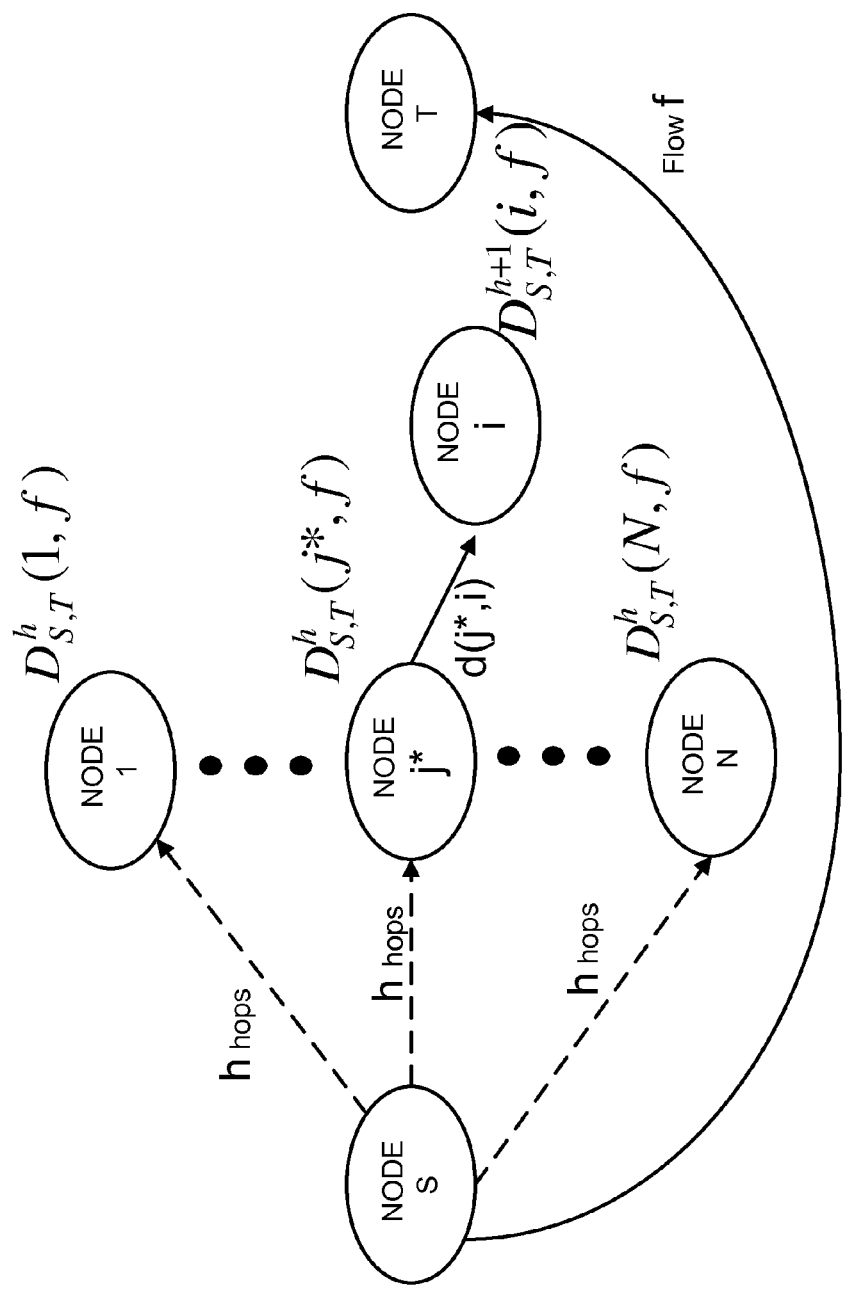
FIG. 3A is a diagram that illustrates a choice of node j* and link d(j*,i)

The following detailed description refers to the accompanying drawings. The same reference numbers in different drawings may identify the same or similar elements. Also, the following detailed description does not limit the invention.

Link and node failures may occur unexpectedly in a network and there are numerous techniques to manage these issues. One approach to attain fast restoration is to provision network connections over rings. This protection architecture can provide two physical link-disjoint paths that may protect the delivery of service when any single node failure or single link failure occurs. However, for some customers, this level of protection may not be sufficient.

Another approach is to protect an end-to-end path with one or more link-disjoint protection paths. With K link-disjoint paths in total, an end-to-end path can survive any combination of K−1 or fewer link failures. For ultra-high availability service, a network may be provisioned, for example, with K=3, K=4, or K=5. However, existing approaches for selecting link-disjoint paths can fail due to traps. A trap problem occurs when the nodes and links associated with a shortest path form a cut (i.e., a source to termination cut) within the network that precludes the finding of other shortest link-disjoint paths from the source node to the termination node (i.e., destination node).

A trap-free shortest link-disjoint algorithm for determining K shortest link-disjoint paths from a source node s to a termination node t without encountering a trap problem has been previously described in parent U.S. patent application Ser. No. 13/029,337 entitled "Trap-Free Shortest Link-Disjoint Paths." According to the trap-free shortest link-disjoint algorithm, the value of K must be less than or equal to the maximum flow from source node s to a termination node t. The maximum flow may be determined using conventional algorithms (e.g., Ford-Fulkerson algorithm, etc.). By way of example, when selecting a first shortest link-disjoint path from node s to node t, the first shortest link-disjoint path must allow for a remaining flow of at least K−1 units in the complementary part of the network. Similarly, when selecting a second shortest link-disjoint path from node s to node t, the second shortest link-disjoint path must allow for a remaining flow of at least K−2 units in the complementary part of the network. According to an exemplary implementation, a generalized Bellman dynamic programming equation may be used to determine whether the complementary part of the network has an appropriate flow for any given candidate shortest link-disjoint path.

According to an exemplary embodiment, a trap-free K-shortest link-disjoint path algorithm is described to a more general case in which a network includes Shared Risk Link Groups (SRLGs). According to an exemplary embodiment of the trap-free K-shortest link-and-SRLG-disjoint path algorithm, shared risks, such as, for example, optical fibers that run in the same conduit, are taken into account when determining an optimal set of K-successive shortest paths that are disjoint in both their links and their risks.

A generalization of the trap-free K-shortest link-and-SRLG-disjoint path algorithm can be based on a sub-problem of determining whether at least a given number of link-and-SRLG-disjoint paths exist in a particular network or sub-network. In the case of K=2 that corresponds to 1+1 protection, the sub-problem may be reduced to determining the connectivity between a pair of nodes. An optimal K=2-successive shortest link-and-SRLG-disjoint paths may then be found by extending the trap-free shortest-link disjoint algorithm.

The term "network," as used herein, is intended to be broadly interpreted to include a wireless network and/or a wired network. The network may have, for example, a mesh topology, a star topology, a fully-connected topology, or some other type of topology. The term "node," as used herein, is intended to be broadly interpreted to include a network device having routing or switching capability. For example, the node may correspond to a router, a switch, a bridge, a gateway, etc.

The term "path," as used herein, is intended to be broadly interpreted to include a physical path and/or a logical path. For example, a link-disjoint path may correspond to an Internet Protocol (IP) path, a Multi-Protocol Label Switching (MPLS) path, a light (i.e., optical) path, a virtual circuit path, or any combination thereof. The path may correspond to an end-to-end path (e.g., from a source node to a termination node).

FIG. 1 is a diagram illustrating an exemplary environment 100 in which an exemplary embodiment for determining and using trap-free K shortest link-disjoint paths may be implemented. As illustrated in FIG. 1, exemplary environment 100 may include a network 105 that includes nodes 110-1 through 110-X (referred to as nodes 110 or node 110), and user device 120.

The number of devices and configuration in environment 100 is exemplary and provided for simplicity. According to other embodiments, environment 100 may include additional devices, fewer devices, different devices, and/or differently arranged devices than those illustrated in FIG. 1. Environment 100 may include wired and/or wireless connections among the devices illustrated.

Network 105 may include one or multiple networks of one or multiple types. Nodes 110 may include a network device having routing capability. User device 120 may include a computational device. For example, user device 120 may correspond to a computer or a server, which may reside inside or outside of network 105.

With reference to FIG. 1, according to an exemplary process, user device 120 may receive information including a network graph of network 105. The network graph may include topology information (e.g., nodes 110 and links). User device 120 may calculate trap-free K-shortest link-and-SRLG-disjoint paths for nodes 110 of network 105 based on a trap-free K-shortest link-and-SRLG-disjoint path algorithm described herein. User device 120 may output the trap-free shortest link-and SRLG-disjoint path results to a user, to another device, etc., as a file(s) and/or other informational structure. User device 120 or some other network management system (not illustrated) may provision nodes 110 according to the determined trap-free K-shortest link-and-SRLG-disjoint paths. For example, the nodes 110 may use one or more of the trap-free K-shortest link-and SRLG-disjoint paths for providing service. The trap-free K-shortest link-and SRLG-disjoint paths may be provisioned off-line or used in dynamic provisioning.

FIG. 2 is a diagram illustrating exemplary components of a device 200 that may correspond to one or more of the devices in environment 100. For example, device 200 may correspond to node 110 and/or user device 120 depicted in FIG. 1. As illustrated, device 200 may include a processor 205, memory/storage 210 including applications 215, and a communication interface 220. According to other implementations, device 200 may include fewer components, additional components, different components, and/or a different arrangement of components than those illustrated in FIG. 2 and described herein. For example, device 200 may include input components (e.g., a touchscreen, a keyboard, a keypad, a microphone, an input port, a mouse, a drive, etc.) and output components (e.g., a display, a speaker, an output port, a drive, etc.).

Processor 205 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), microcontrollers, central processing units (CPUs) (e.g., one or multiple cores), microcontrollers, or some other hardware component that may interpret and/or execute instructions and/or data. Depending on the type of processor 205, processor 205 may be implemented as hardware (e.g., a microprocessor, etc.), a combination of hardware and software (e.g., a SoC, etc.), may include one or multiple memories (e.g., memory/storage 210), etc.

Processor 205 may control the overall operation, or a portion of operation(s) performed by device 200. Processor 205 may perform one or multiple operations based on an operating system and/or various applications (e.g., applications 215). Processor 205 may access instructions from memory/storage 210, from other components of device 200, and/or from a source external to device 200 (e.g., another device, a network, etc.).

Memory/storage 210 may include one or multiple memories and/or one or multiple other types of tangible storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.), a floppy disk (e.g., a zip disk, etc.), a tape, a Micro-Electromechanical System (MEMS)-based storage medium, and/or a nanotechnology-based storage medium.

Memory/storage 210 may be external to and/or removable from device 200, such as, for example, a Universal Serial Bus (USB) memory stick, a dongle, a hard disk, mass storage, off-line storage, or some other type of storing medium (e.g., a computer-readable medium, a compact disk (CD), a digital versatile disk (DVD), a Blu-Ray® disk (BD), etc.). Memory/storage 210 may store data, application(s), and/or instructions related to the operation of device 200.

Applications 215 may include software or a program that provides various services or functions. For example, with reference to node 110, applications 215 may include one or multiple applications pertaining to routing packets or other forms of network traffic. With reference to user device 120, applications 215 may include an application that, when executed, determines trap-free K shortest link-and-SRLG-disjoint paths in a network (e.g., network 105), as described herein.

Communication interface 220 may permit device 200 to communicate with other devices, networks, systems and/or the like. Communication interface 220 may include one or multiple wireless interface(s) and/or wired interface(s). Communication interface 220 may include one or multiple transmitter(s) and receiver(s), or transceiver(s). Communication interface 220 may operate according to one or multiple protocols, standards, and/or the like.

Device 200 may perform operation(s) and/or process(es) in response to processor 205 executing software instructions stored by memory/storage 210. For example, the instructions may be read into memory/storage 210 from another memory/storage 210 or from another device via communication interface 220. The instructions stored in memory/storage 210 may cause processor 205 to perform one or more processes described herein. Alternatively, for example, according to another implementation, device 200 may perform one or more processes described herein based on the execution of hardware (e.g., processor 205, etc.), the execution of hardware and firmware, or the execution of hardware, software (e.g., applications 215), and firmware.

A description of the trap-free K shortest link-disjoint path algorithm is described below before explaining the trap-free K-shortest link-and-SRLG-disjoint path algorithm. Some of the variables described are applicable to both algorithms.

A network graph may be defined as G(N,L), where N = $\{1, \ldots, N\}$ and is the set of node labels, and L = $\{1, \ldots, L\}$ and is the set of link labels. N=|N| is the number of nodes, and L=|L| is the number of links. Each link is assumed to be bidirectional. The length of the link from node i to node j is denoted by d(i,j). Since the links are bidirectional, it may be assumed that d(i,j)=d(j,i). If there is no link between i and j, then d(i,j)=∞. It may also be assumed that there is an imaginary self-looping link of zero length at each node i, i.e., d(i,i)=0. The label of the link from node i to node j is denoted by e(i,j). If there is no link between nodes i and j, then e(i,j) is equal to the empty set φ. $P_{s,t}^h(i,f)$ may be defined as the set of links in the shortest h-hop path from node s to node i such that the flow from node s to node t is at least f units in the complementary part of the network G(N,L−$P_{s,t}^h(i,f)$). $D_{s,t}^h(i,f)$ may be defined as the total length of the set of h links in $P_{s,t}^h(i,f)$. The maximum flow from node s to node t in the network G(N,L) can be denoted by $F_{s,t}^{MAX}(N,L)$. For f≤$F_{s,t}^{MAX}(N,L)$−1, the following Bellman equation provides a recursion over the number of hops h for computing $D_{s,t}^h(i,f)$:

$$D_{s,t}^{h+1}(i, f) = \underset{j \in A_{s,t}^h(i, f)}{\text{Min}} \{D_{s,t}^h(j, f) + d(j, i)\}, \quad (1)$$

in which $$A_{s,t}^h(i, f) = \{j \mid j \in N, F_{s,t}^{Max}(N, L - P_{s,t}^h(j, f) - e(j, i)) \geq f\}.$$

In other words, $A_{s,t}^h(i,f)$ is the set of nodes j for which the network G(N,L−$P_{s,t}^h(j,f)$−e(j,i)) supports a flow capacity of at least f units from nodes s to t assuming unit link capacities. Node j* may be defined as node j in equation (1) that minimizes $D_{s,t}^h(j,f)$+d(j,i) over j ∈ $A_{s,t}^h(i,f)$. The link from node j* to node i, that is, link e(j*,i), is on the shortest (h+1)-hop path $P_{s,t}^{h+1}(i,f)$ from node s to node i such that the flow capacity from node s to node t is at least f units in the part of the network G(N,L−$P_{s,t}^h(j*,f)$−e(j*,i)) assuming unit link capacities. The set of links in this shortest (h+1)-hop path is given by $$P_{s,t}^{h+1}(i,f) = e(j^*,i) \cup P_{s,t}^h(j^*,f). \quad (2)$$

The optimal choice of node j* and link d(j*,i) is represented in FIG. 3A. In some cases, the optimal link e(j*,i) may be a self-looping link, in which case j*=i.

For h sufficiently large: (a) the value of $D_{s,t}^h(t,f)$ converges to the length of the shortest path from node s to node t such that the complementary part of the network supports a flow capacity of at least f units from node s to node t assuming link capacities; and (b) the set $P_{s,t}^h(i,f)$ includes the corresponding set of links in this shortest path.

Figure 4A:
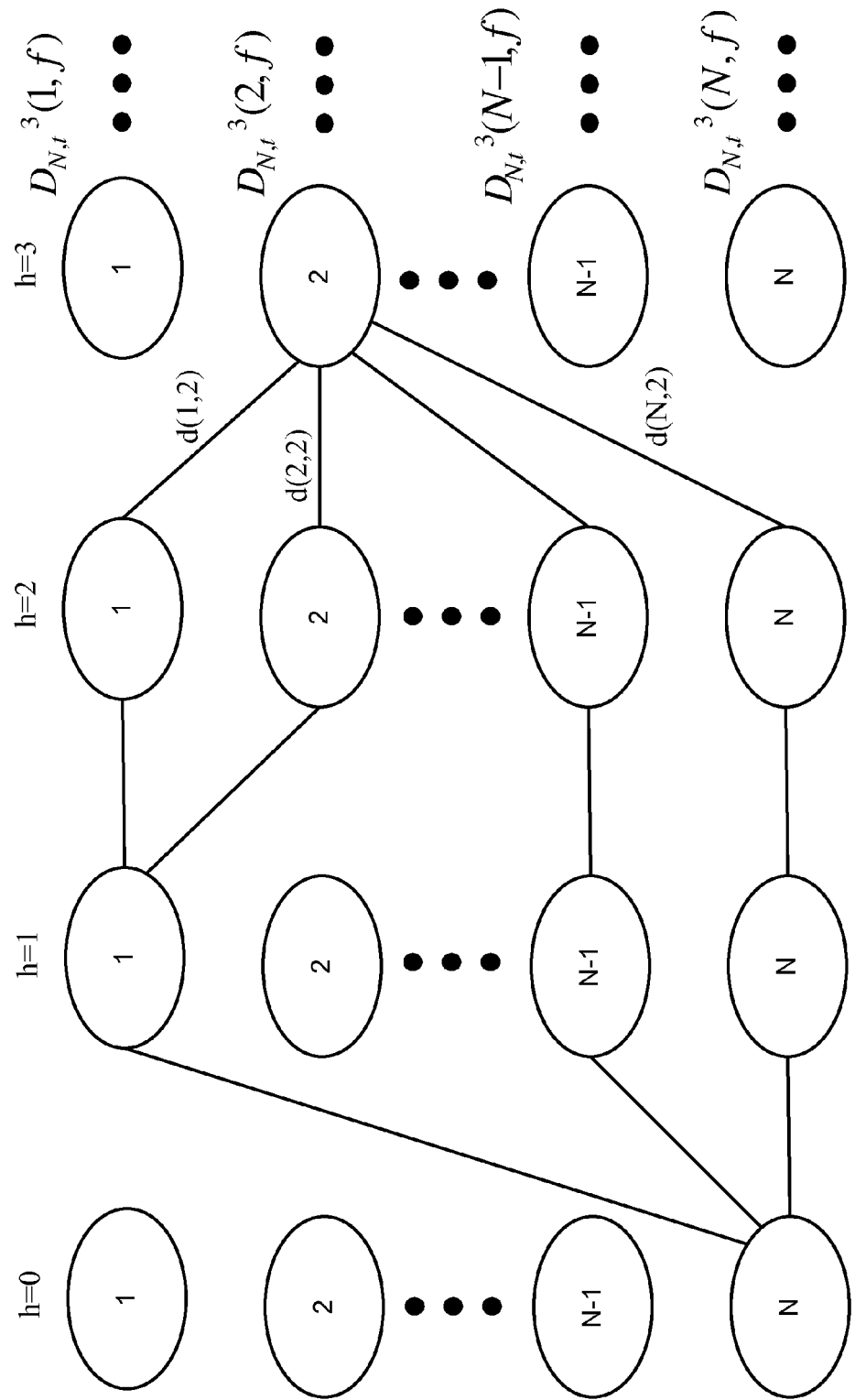
FIG. 4A is a diagram illustrating an exemplary representation of convergence when $D_{s,t}^{h+1}(i,f)=D_{s,t}^{h}(i,f)$ for $1 \leq i \leq N$.

The trap-free K shortest link-disjoint path algorithm is based on equations (1) and (2). The algorithm is summarized in pseudo-code form below. The main outer loop in the algorithm is over the K link-disjoint paths that are to be found. It is assumed a priori that K≤$F_{s,t}^{Max}(N,L)$. This ensures that at least K link-disjoint paths actually exist between nodes s and t. If this is not the case, then a smaller value of K must, necessarily, be chosen for the node pair (s,t). The value of $F_{s,t}^{Max}(N,L)$ is a function of (s,t). The (integer) value of $F_{s,t}^{Max}(N,L)$ can be found by applying the Ford-Fulkerson maximum flow algorithm to G(N,L) with the link capacities all set to unity. The main iteration is over the number of hops h until convergence is established in the set of values {$D_{s,t}^{h+1}(i,f)$|1≤i≤N}. Convergence is recognized when $D_{s,t}^{h+1}(i,f)$= $D_{s,t}^h(i,f)$ for 1≤i≤N. The iteration is represented in FIG. 4A.

In the optimization part of the iteration, a search is performed for an unmarked node $j_{min}$ that minimizes d(j,i)+ $D_{s,t}^{h-1}(j,f)$. Once found, the unmarked node is marked as node $j_{min}$ and the Ford-Fulkerson maximum flow algorithm is used to find $$\beta = F_{s,t}^{Max}(N, L - P_{s,t}^{h-1}(j_{min}, f) - e(j_{min}, i)).$$

The variable β denotes the maximum flow capacity from node s to node t in the network G(N,L−$P_{s,t}^{h-1}(j_{min},f)$−e($j_{min}$, i)), in which $P_{s,t}^{h-1}(j_{min}, f)$ is the set of links in the shortest h−1 hop path from node s to node $j_{min}$, and e($j_{min}$, i) is the link from node $j_{min}$ to node i, such that the flow capacity from node s to node t is at least f units in the complimentary part of the network, assuming unit link capacities. If β≥f, then $j_{min}$ is the optimal node j*. If not, the search process for j* continues.

Once the set of distances is seen to have converged, the main iteration is terminated since any further increase in the number of hops would not reduce or increase any of the subsequent distant values.

According to the exemplary expressions below, trap-free K shortest link-disjoint paths may be determined. In the following expressions, φ denotes the empty set and δ(.) is the indicator function used to mark nodes.

---

For 1 ≤ k ≤ K, find the $k^{th}$ link-disjoint path from s to t
{
    Set required minimum remaining flow: f = K − k.
    Initialize $D_{s,t}^0$ (j, f) = ∞ , for 1 ≤ j ≤ N, j ≠ s, and 0 if j = s.
    Set h = 1. Initialize $P_{s,t}^0$ (j, f) = φ , for 1 ≤ j ≤ N.
    Main iteration:
        While { $D_{s,t}^h$ (i, f) | 1 ≤ i ≤ N } is not converged {
            For 1≤i≤N {
                Initialize δ(j) = 0, for 1≤j≤N.
                While j* not found {
        Optimization Part:
            Find the node $j_{min}$ that minimizes
                d(j, i) + $D_{s,t}^{h-1}$ (j, f) over j ∈ {k | k ∈ N, e(k, i) ≠ φ,
                δ(k) = 0}.
            Mark the node $j_{min}$ : δ($j_{min}$) = 1.
            Use the Ford-Fulkerson maximum flow algorithm to
            find β = $F_{s,t}^{Max}$ (N, L − $P_{s,t}^{h-1}$ ($j_{min}$ , f) − e($j_{min}$ , i)).
            If β ≥ f {
                j* = $j_{min}$ (j* is the optimal node)
                $D_{s,t}^h$ (i, f) = d(j*,i) + $D_{s,t}^{h-1}$ (j*, f)
                If j* ≠ i: $P_{s,t}^h$ (i, f) = e(j*,i) ∪ $P_{s,t}^{h-1}$ (j*, f).
            }
        }
        }
        Increment the number of hops: h = h+1.
    }
    Output the $k^{th}$ shortest link-disjoint path $P_{s,t}^{h-1}$ (t, f).
    Remove the links $P_{s,t}^{h-1}$ (t, f) from G(N, L):
        L = L − $P_{s,t}^{h-1}$ (t, f).
}

---

The computation of β can be skipped when f=0 since β is always greater or equal to zero.

As previously described, according to exemplary embodiment, a trap-free K-shortest link-and-SRLG-disjoint path algorithm takes into account shared risks when determining an optimal set of K-successive shortest paths that are disjoint in both their links and their risks. The trap-free K-shortest link-and-SRLG-disjoint paths may subsequently be provisioned in a network. A further description of an exemplary process is described further below.

A total number of SRLGs in a network is denoted by R. The set of links in an SRLG r is denoted by R(r). A particular link may belong to one or more SRLGs. A link may also not belong to any SRLG. When an SRLG is in a failed state, all of the links in the SRLG are in a failed state.

A relationship between a link l and an SRLG r is denoted by the function $\rho(l,r)$. It may be assumed that $\rho(l,r)=1$, if link l belongs to SRLG r, and 0 otherwise. Also, the set of all the links in the SRLG to which link l belongs can be denoted by SRLG(l), in which SRLG(l) may be expressed as:

$$SRLG(l) = \cup_{r=1,\ldots,R | \rho(l,r)=1} R(r),$$

in which if link l does not belong to any SRLG, then SRLG(l)=$\phi$, in which $\phi$ is equal to the empty set.

The set of all links in the SRLG to which the links in a set of links P belong can be denoted by SRLG(P), in which SRLG(P) may be expressed as:

$$SRLG(P) = \cup_{r=1,\ldots,R | \rho(l,r)=1, l \in P} R(r),$$

in which if the links in P do not belong to any SRLG, then SRLG(P)=$\phi$.

Two paths with link sets $P_1$ and $P_2$, respectively, are said to be link-and SRLG-disjoint if $P_1$ and $P_2$ have no links in common and $SRLG(P_1)$ and $SRLG(P_2)$ have no links in common. The maximum number of link-and-SRLG-disjoint paths that can be supported between node s and node t in the network G(N,L) can be denoted by $H_{s,t}^{Max}(N,L)$. Note that $H_{s,t}^{Max}(N,L) = F_{s,t}^{MAX}(N,L)$ in the case that there are no SRLGs in the network (i.e., when R=0).

$Q_{s,t}^{h}(i,f)$ can be defined as the set of links in the shortest h-hop path from node s to node i such that the number of link-and-SRLG-disjoint paths that can be supported between nodes s and t in the complementary part of the network $G(N,L-Q_{s,t}^{h}(i,f)-SRLG(Q_{s,t}^{h}(i,f)))$ is at least equal to f. This complementary part is, by definition, link-disjoint from $Q_{s,t}^{h}(i,f)$ and $SRLG(Q_{s,t}^{h}(i,f))$. $E_{s,t}^{h}(i,f)$ denotes the total length of the set of h links in $Q_{s,t}^{h}(i,f)$. Then, for $f \leq H_{s,t}^{Max}(N,L)-1$, the following Bellman equation that provides a recursion over the number of hops h for computing $E_{s,t}^{h}(i,f)$ may be expressed as:

$$E_{s,t}^{h+1}(i,f) = \underset{j \in B_{s,t}^{h}(i,f)}{\text{Min}} \{E_{s,t}^{h}(j,f) + d(j,i)\}, \quad (3)$$

in which $B_{s,t}^{h}(i,f) = \{j | j \in N, H_{s,t}^{Max}(N,L-Q_{s,t}^{h}(j,f)-e(j,i)-SRLG(Q_{s,t}^{h}(j,f))-SRLG(e(j,i))) \geq f\}$.

Figure 3B:
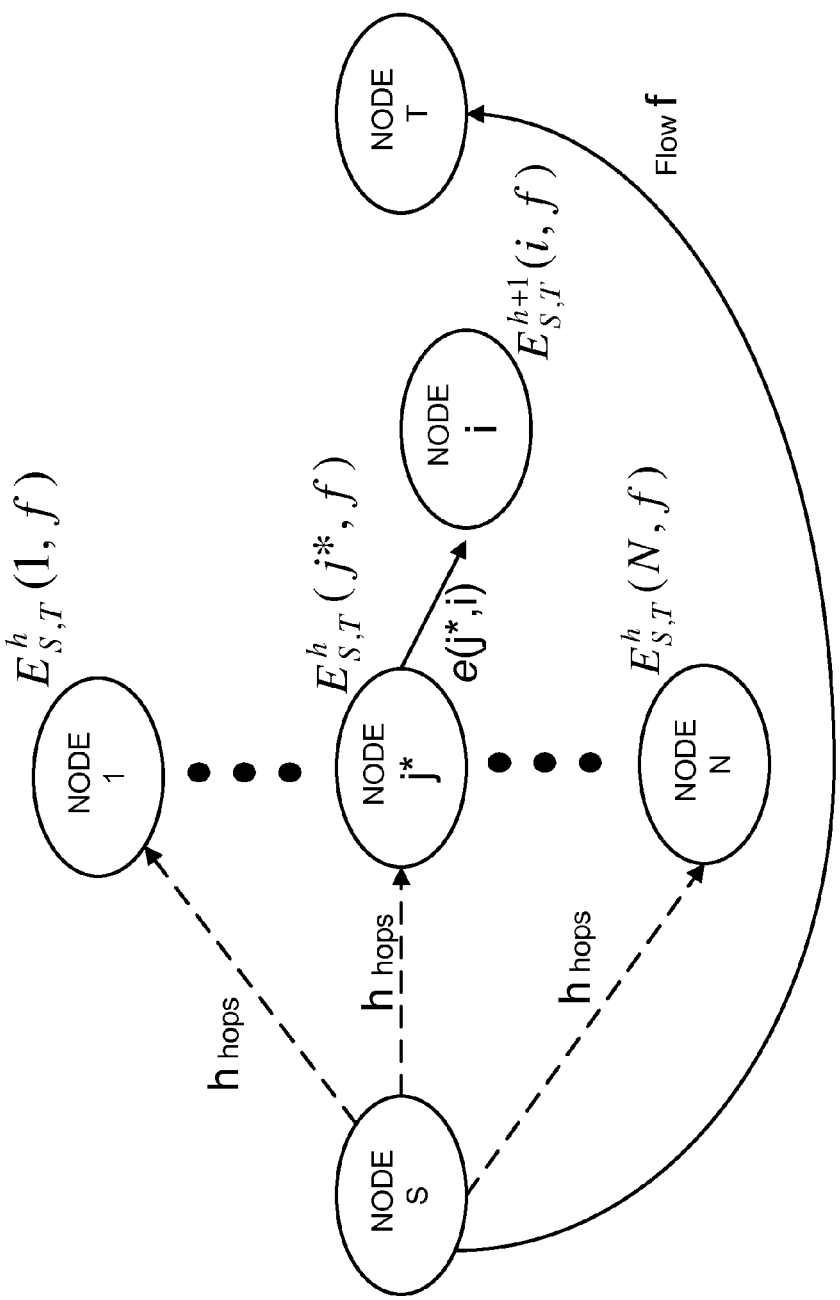
FIG. 3B is a diagram that illustrates a choice of node j* and link e(j*,i)

In other words, $B_{s,t}^{h}(i,f)$ is the set of nodes j for which the network $G(N,L-Q_{s,t}^{h}(j,f)-e(j,i)-SRLG(Q_{s,t}^{h}(j,f))-SRLG(e(j,i)))$ supports at least f link-and SRLG-disjoint paths between node s and node t. The variable j* can be defined as the network node j in equation 3 above, which minimizes $E_{s,t}^{h}(j,f)+d(j,i)$ over $j \in B_{s,t}^{h}(i,f)$. The link from node j* to node i, as illustrated in FIG. 3B as e(j*,i), is on the shortest (h+1)-hop path $Q_{s,t}^{h+1}(i,f)$ from node s to node i such that the number of link-and-SRLG-disjoint paths between node s to node t in the part of the network $G(N,L-Q_{s,t}^{h}(j,f)-e(j,i)-SRLG(Q_{s,t}^{h}(j,f))-SRLG(e(j,i)))$ is at least equal to f. The set of links in this shortest (h+1)-hop path is given by:

$$Q_{s,t}^{h+1}(i,f) = e(j^*,i) \cup Q_{s,t}^{h}(j^*,f). \quad (4)$$

In some cases the optimal link e(j*,i) may sometimes be a self-looping link, in which case j*=i.

For h sufficiently large, (a) the value of $E_{s,t}^{h}(t,f)$ converges to the length of the shortest path from node s to node t such that the complementary part of the network $G(N,L-Q_{s,t}^{h}(t,$ f)-$SRLG(Q_{s,t}^{h}(t,f))$ supports at least f link-and-SRLG-disjoint paths between node s to node t; and (b) the set $Q_{s,t}^{h}(t,f)$ includes the corresponding set of links in this shortest path.

Figure 4B:
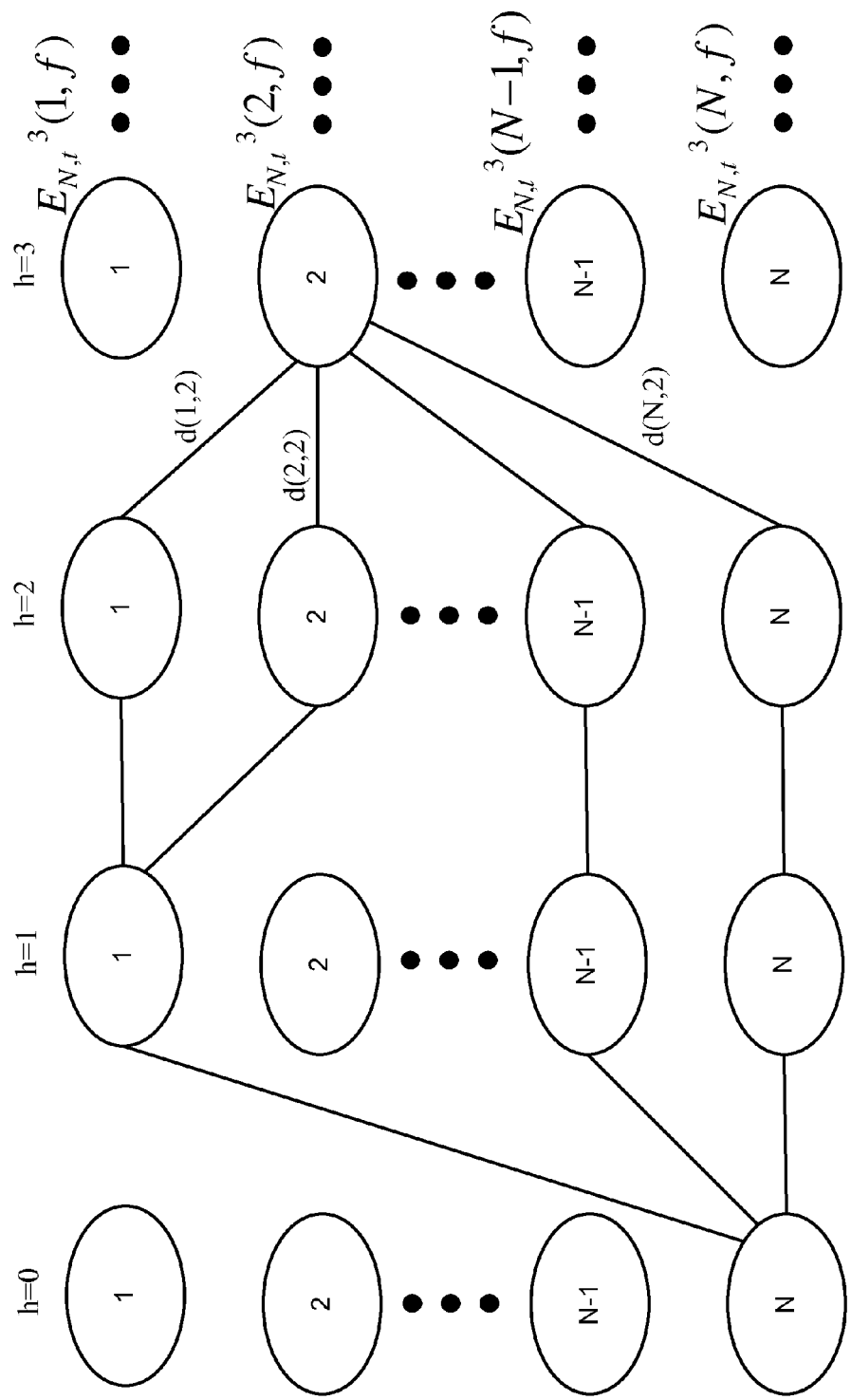
FIG. 4B is a diagram illustrating another exemplary representation of convergence when $E_{s,t}^{h+1}(i,f)=E_{s,t}^{h}(i,f)$ for $1 \leq i \leq N$.

The trap-free K-shortest link-and SRLG-disjoint path algorithm is based on equations (3) and (4). The trap-free K-shortest link-and SRLG-disjoint path algorithm is provided below in pseudo-code form. The main outer loop in the algorithm is over the K link-and-SRLG-disjoint paths that are to be found. It is assumed a priori that $K \leq H_{s,t}^{Max}(N,L)$. This ensures that at least K-link-and-SRLG-disjoint paths actually exist between node s and node t. If this is not the case, then a smaller value of K must, necessarily, be chosen for the node pair (s,t). The value of $H_{s,t}^{Max}(N,L)$ is a function of (s,t). The main iteration is over the number of hops h until convergence is established in the set of values $\{E_{s,t}^{h+1}(i,f)|1 \leq i \leq N\}$. As illustrated in FIG. 4B, convergence is recognized when it is seen that $E_{s,t}^{h+1}(i,f)=E_{s,t}^{h}(i,f)$ for $1 \leq i \leq N$. For example, convergence is seen when h=3. In an optimization part of the iteration, a search is made for an unmarked node $j_{min}$ that minimizes $d(j,i)+E_{s,t}^{h-1}(j,f)$. Node $j_{min}$ is marked and $\beta$ is found according to the exemplary expression:

$$\beta = H_{s,t}^{Max}(N,L-Q_{s,t}^{h-1}(j_{min},f)-e(j_{min},i)-SRLG(Q_{s,t}^{h-1}(j_{min},f))-SRLG(e(j_{min},i))).$$

The variable $\beta$ denotes the maximum number of link-and-SRLG-disjoint paths from node s to node t in the network, in which the network is denoted by $G(N,L-Q_{s,t}^{h-1}(j_{min},f)-e(j_{min},i)-SRLG(Q_{s,t}^{h-1}(j_{min},f))-SRLG(e(j_{min},i)))$, in which $Q_{s,t}^{h-1}(j_{min},f)$ is the set of links in the shortest h−1 hop path from node s to node $j_{min}$, and $e(j_{min},i)$ is the link from node $j_{min}$ to node i, and $SRLG(Q_{s,t}^{h-1}(j_{min},f))$ and $SRLG(e(j_{min},i))$ are the links of the SRLG(s) associated with the shortest h−1 hop path and the link from node $j_{min}$ to node i, such that the flow capacity (i.e., such that the maximum number of link-and-SRLG-disjoint paths) from node s to node t is at least f in the complimentary part of the network, assuming unit link capacities. If $\beta \geq f$, then $j_{min}$ is the optimal node choice j*. If not, then the iteration continues to search for j*.

Once the set of distances has converged, the main iteration is terminated since any further increase in the number of hops may not reduce (or increase) any of the subsequent distance values.

According to the exemplary expressions below, trap-free K shortest link-and-SRLG-disjoint paths may be determined:

```
For 1 ≤ k ≤ K, find the k^th link-and SRLG-disjoint path from s to t
{
Set the required number of link-and-SRLG-disjoint paths: f = K−k.
        Initialize E_{s,t}^0 (j, f) = ∞ , for 1≤j≤N, j ≠s, and 0 if j=s.
        Initialize Q_{s,t}^0 (j, f) = φ , for 1≤j≤N.
        Initialize the number of hops: h = 1.
        Main Iteration:
        While { E_{s,t}^h (i, f) | 1 ≤ i ≤ N } not converged {
            For 1≤i≤N {
                Initialize δ(j) = 0, for 1≤j≤N.
                While j* not found {
        Optimization Part:
                    Find the node j_{min} that minimizes
                    d(j, i) + E_{s,t}^{h−1} (j, f) over j ∈ {k | k ∈ N, e(k, i) ≠ φ,
                    δ(k) = 0}.
                    Mark the node j_{min} : δ(j_{min} ) = 1.
                    Find β = H_{s,t}^{Max} (N, L − Q_{s,t}^{h−1} (j_{min} , f ) − e(j_{min} , i) −
                    SRLG(Q_{s,t}^{h−1} (j_{min} , f )) − SRLG(e(j_{min} , i))).
                    If β ≥ f {
                        j* = j_{min} (j* is the optimal node)
                        E_{s,t}^h (i, f ) = d(j*,i) + E_{s,t}^{h−1} (j*, f )
                        If j* ≠ i: Q_{s,t}^h (i, f) = e(j*,i) ∪ Q_{s,t}^{h−1} (j*, f ).
                    }
                }
            }
        }
}
```

```
        Increment the number of hops: h = h+1.
    }
    Output the $k^{th}$ shortest link-and-SRLG-disjoint path $Q_{s,t}^{h-1}$ (t, f ).
    Remove the sets of links $P_{s,t}^{h-1}$ (t, f ) and SRLG($P_{s,t}^{h-1}$ (t, f )) from
    G(N, L):
        L = L − $P_{s,t}^{h-1}$ (t, f ) − SRLG($P_{s,t}^{h-1}$ (t, f )).
}
```

The computation of β can be skipped when f=0 since β is always greater or equal to zero.

To compute β, or at least how to find if β is at least equal to f, has not been described. According to one example, to find if β is at least equal to f, a determination may be made to find if the number of link-and-SRLG-disjoint paths between node s and node t in the network $$G(N, L-Q_{s,t}^{h-1}(j_{min}, f)-e(j_{min}, i)-SRLG(Q_{s,t}^{h-1}(j_{min}, f))-SRLG(e(j_{min}, i)))$$

is at least equal to f.

For a general value of f, the Ford-Fulkerson maximum flow algorithm cannot simply be applied to compute β since the network contains a SRLG. However, in the case of K=2 (i.e., 1+1 path protection using a pair of link-and-SRLG-disjoint paths), β may be computed when f=1. The problem of computing β when f=1 is described below.

In the case of two paths (K=2), which is a common protection scheme (e.g., primary path and backup path), it may be determined whether at least one path exists between node s and node t in the network. However, this is equivalent to determining if node s and node t are connected since if these nodes are, then at least one path must exist. When f=0, the computation of β can be skipped since β is always greater than or equal to zero.

Another approach is to use Dijkstra's algorithm to find the $2^{nd}$ link-and-SRLG-disjoint path after the $1^{st}$ path has been found. This can be done since when K=2 and f=0, there is no longer any flow constraint being imposed in the determination of the $2^{nd}$ shortest path. Hence, any shortest path algorithm may be used to find the $2^{nd}$ shortest path. An algorithm for finding two paths is described below in pseudo-form.

The computation of a maximum β of link-and-SRLG-disjoint paths in a network with SRLGs can be solved by a brute-force approach. For example, a brute-force approach can include generating all possible sets of link-disjoint paths, while ignoring the presence of SRLG, to find which one of the sets contains the highest number of link-and-SRLG-disjoint paths. Under such an approach, the highest number corresponds to β.

According to the exemplary expressions below, trap-free K shortest link-and-SRLG-disjoint paths may be determined for two paths (K=2):

Find the $1^{st}$ link-and-SRLG-disjoint path from node s to node t:

```
    Initialize $E_{s,t}^0$ (j,1) = ∞ , for 1≤j≤N, j ≠s, and 0 if j=s.
    Initialize $Q_{s,t}^0$ (j,1) = φ , for 1≤j≤N.
    Initialize the number of hops: h = 1.
        Main Iteration:
            While { $E_{s,t}^h$ (i,1) | 1 ≤ i ≤ N } is not converged {
                For 1≤i≤N {
                    Initialize δ(j) = 0, for 1≤j≤N.
                    While j* not found {
                    Optimization Part:
                        Find the node $j_{min}$ that minimizes d(j, i) + $E_{s,t}^{h-1}$ (j,1) over
                        j ∈ {k | k ∈ N, e(k, i) ≠ φ, δ(k) = 0}.
                        Mark the node $j_{min}$ : δ($j_{min}$ ) = 1.
```

```
                        If node s is connected to node t in
                        G(N, L − $Q_{s,t}^{h-1}$ ($j_{min}$ ,1) − e($j_{min}$ , i) − SRLG($Q_{s,t}^{h-1}$
                        ($j_{min}$ ,1)) − SRLG(e($j_{min}$ , i))) {
                            j* = $j_{min}$ (j* is the optimal node)
                            $E_{s,t}^h$ (i,1) = d(j*,i) + $E_{s,t}^{h-1}$ (j*,1)
                            If j* ≠ i: $Q_{s,t}^h$ (i,1) = e(j*,i) ∪ $Q_{s,t}^{h-1}$ (j*,1).
                        }
                    }
                }
            Increment the number of hops: h = h+1.
}
Output the $1^{st}$ shortest link-and-SRLG-disjoint path $Q_{s,t}^{h-1}$ (t,1).
```

Find the $2^{nd}$ link-and-SRLG-disjoint path from node s to node t:

Use Dijkstra's algorithm to find the shortest path $Q_{s,t}$(t,0) from node s to node t in the network G(N,L−$Q_{s,t}^{h-1}$(t,1)−SRLG($Q_{s,t}^{h-1}$(t,1))).

Output the $2^{nd}$ shortest link-and-SRLG-disjoint path $Q_{s,t}$(t, 0).

A brute force approach to solving the two path problem is to search s-t paths in order of increasing total path length until one is found that has a link-and-SRLG-disjoint counterpart. However, a brute force approach may be inefficient for large networks. Additionally, a brute force approach may be less efficient when extended to find more than two paths.

A number of algorithms have been developed for finding disjoint paths in network with SRLG. Most of these algorithms are either of a heuristic type, which may fail, or based on mathematical programming formulations, which always work in principle, but whose computational costs are impractical for large networks.

The trap-free K-shortest link-and-SRLG-disjoint path algorithm is a non-heuristic algorithm that finds the exact, optimal solution for the K-successively shortest link-and-SRLG-disjoint paths. The trap-free K-shortest link-and-SRLG-disjoint path algorithm also avoids the problem of traps.

Figure 5A:
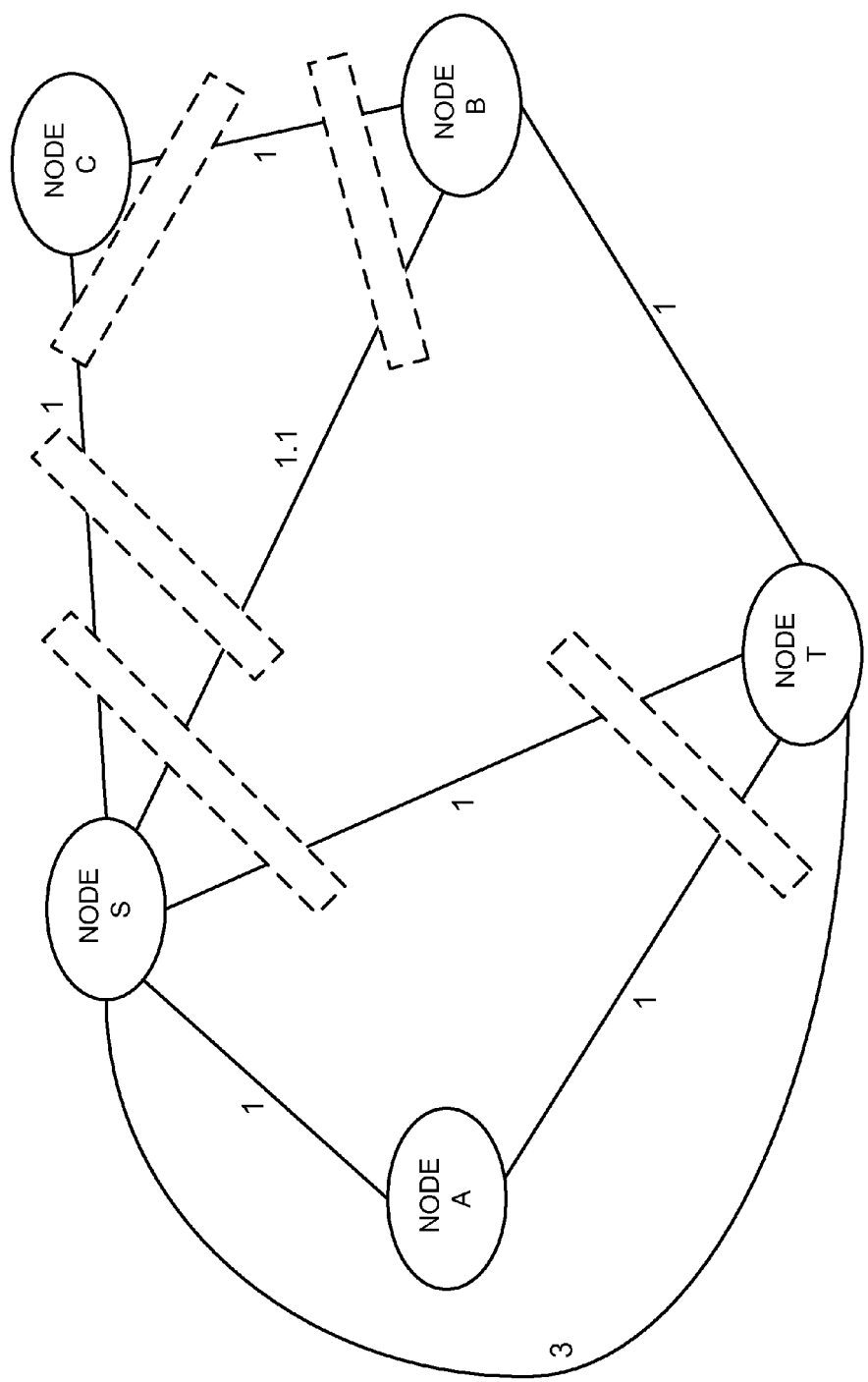
FIG. 5A is a diagram illustrating an exemplary network with shared risk link groups.

FIG. 5A is a diagram of an exemplary network having shared link risk groups. For example, the rectangles illustrated in FIG. 5A represent the following shared risk link groups {S-C, S-B, S-T}; {S-C, S-B}; {S-C, C-B}; {S-B, C-B} and {S-T, A-T}. For example, the shared risk may be breakage of a conduit that is shared among multiple fiber links.

According to the above-mentioned shared risk link groups, if the first shortest path is selected to be S-T, then it will not be possible to find two additional link-and-SRLG-disjoint paths.

Figure 5B:
FIGS. 5B and 5C are diagrams illustrating exemplary tables that include the total lengths $E_{s,t}^{h}(i,f)$ of the set of h links in $Q_{s,t}^{h}(i,f)$ and the set of links in the shortest h-hop path $Q_{s,t}^{h}(i,f)$ pertaining to a discovery of a first shortest link-and-SRLG-disjoint path.
Figure 5C:

FIGS. 5B and 5C are diagrams illustrating exemplary tables that include the total lengths $E_{s,t}^h$(i,f) of the set of h links in $Q_{s,t}^h$(i,f) and the set of links in the shortest h-hop path $Q_{s,t}^h$(i,f) pertaining to a discovery of a first shortest link-and-SRLG-disjoint path. In this example, f=2. Tables 500 and 510 illustrated in FIGS. 5B and 5C, in addition to the exemplary network illustrated in FIG. 5A, will be used to describe a process in which a first shortest link-and-SRLG path is selected such that the complimentary part of the network supports two additional link-and-SRLG-disjoint paths.

Referring to FIG. 5B, and under the heading h=1 in Table 500, f=2 for $E_{s,t}^h$(i,f) and $Q_{s,t}^h$(i,f). Under column i, in Table 500, the total lengths or distances of the set of h links in $Q_{s,t}^h$(i,f), represented by $E_{s,t}^h$(i,f) equals 0, from node S to node S, equals 1, from node S to node A, equals 1.1 from node S to node B, equals 1, from node S to node C, and equals 3, from node S to node T.

Figure 5D:
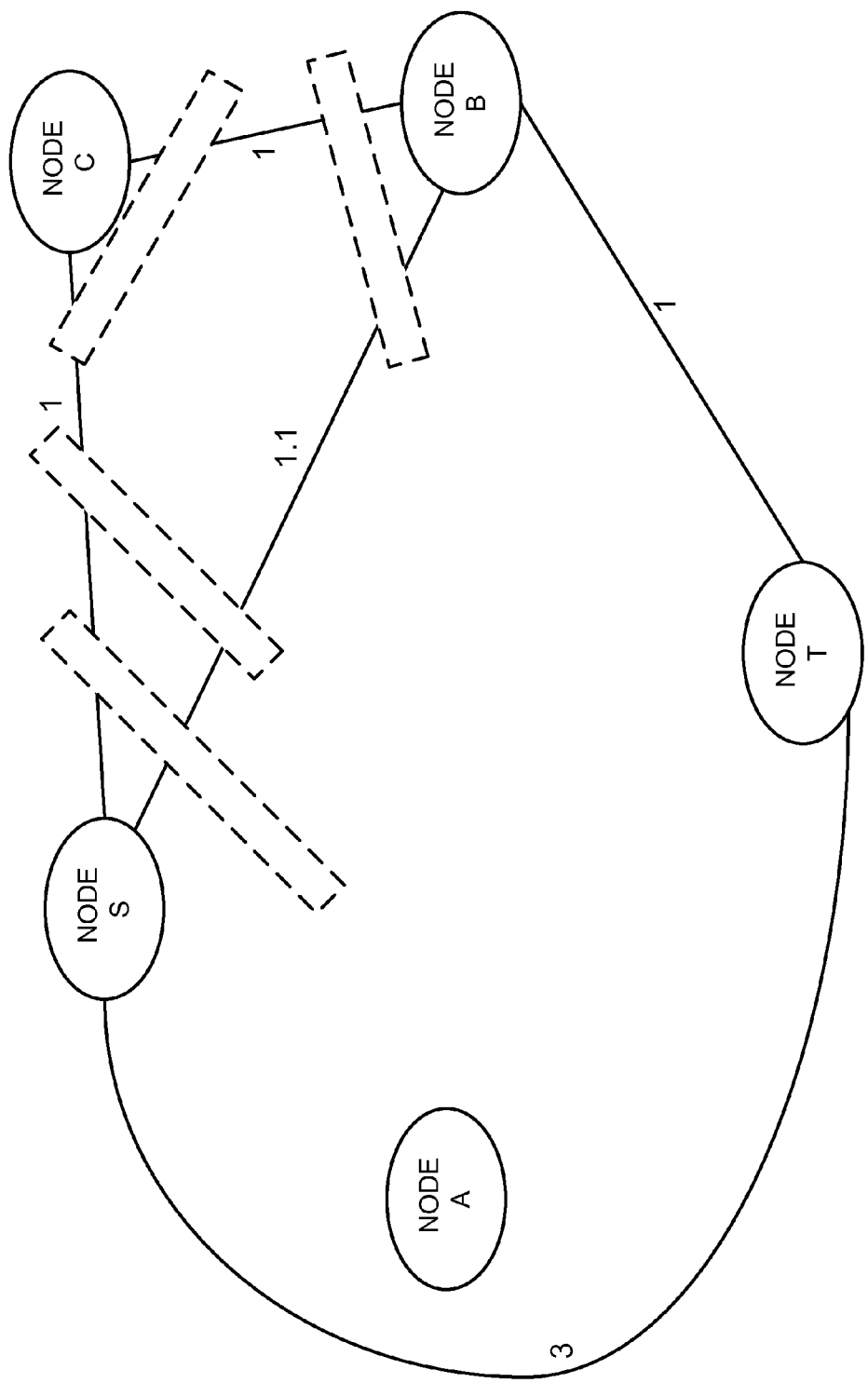
FIG. 5D is a diagram illustrating the exemplary network with the first shortest link-and-SRLG-disjoint path removed.

Referring to FIG. 5B, in Table 500, and under the heading h=2, from node S to node S, from node S to node A . . . , and from node S, to node A, to node T, may be interpreted in a similar manner. Referring to FIG. 5C, in Table 510 and under the heading h=3, the values for $E_{s,t}^{h}(i,f)$ and the nodes of $Q_{s,t}^{h}(i,f)$ are the same as in Table 500 of FIG. 5B, when h=2. As such, this represents a convergence of a first shortest link-and-SRLG-disjoint path from node S to node T. Since the path S-A-T, having a length of 2, is selected as the first shortest link-and-SRLG-disjoint path, the path S-A-T and links in SRLG associated with the path S-A-T, may be removed from further consideration, as illustrated in FIG. 5D.

Figure 5F:

FIGS. 5E and 5F are diagrams illustrating exemplary tables that include the total lengths $E_{s,t}^{h}(i,f)$ of the set of h links in $Q_{s,t}^{h}(i,f)$ and the set of links in the shortest h-hop path $Q_{s,t}^{h}(i,f)$ pertaining to a discovery of a second shortest link-and-SRLG-disjoint path. Tables 520 and 530 illustrated in FIGS. 5E and 5F, in addition to the exemplary network illustrated in FIG. 5D, will be used to describe a process in which a second shortest link-and-SRLG path is selected such that the complimentary part of the network supports one additional link-and-SRLG-disjoint path.

Figure 5G:
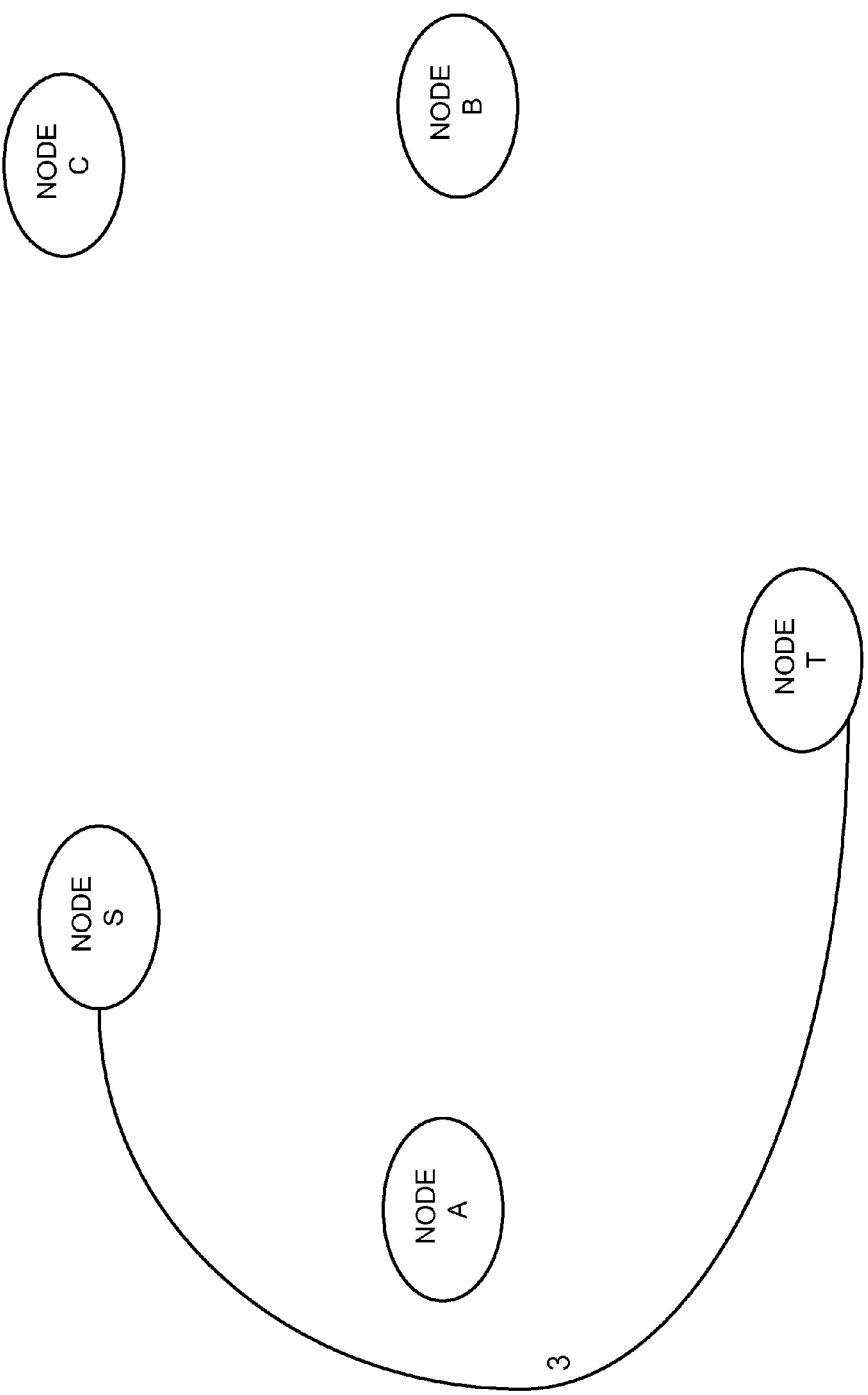
FIG. 5G is a diagram illustrating the exemplary network with the second shortest link-and-SRLG-disjoint path removed.

Referring to FIG. 5E, when h=1, Table 520 includes in the $E_{S,T}^{h}(i,1)$ column values 0, blank, 1.1, 1, and 3. When h=2, Table 520 includes in the $E_{S,T}^{h}(i,1)$ column values 0, blank, 1.1, 1, and 2.1. Referring to FIG. 5F, when h=3, Table 530 includes in the $E_{S,T}^{h}(i,1)$ column values 0, blank, 1.1, 1, and 2.1. Again, as previously described, this represents a convergence of a second shortest link-and-SRLG-disjoint path from node S to node T. Since the path S-B-T, having a length of 2.1, is selected as the second shortest link-and-SRLG-disjoint path, the path S-B-T and links in SRLG associated with the path S-B-T, may be removed from further consideration, as illustrated in FIG. 5G. As illustrated in FIG. 5G, the only remaining path left in the exemplary network is S-T, which may be selected as the third shortest link-and-SRLG-disjoint path, having a length of 3.

Figure 6A:
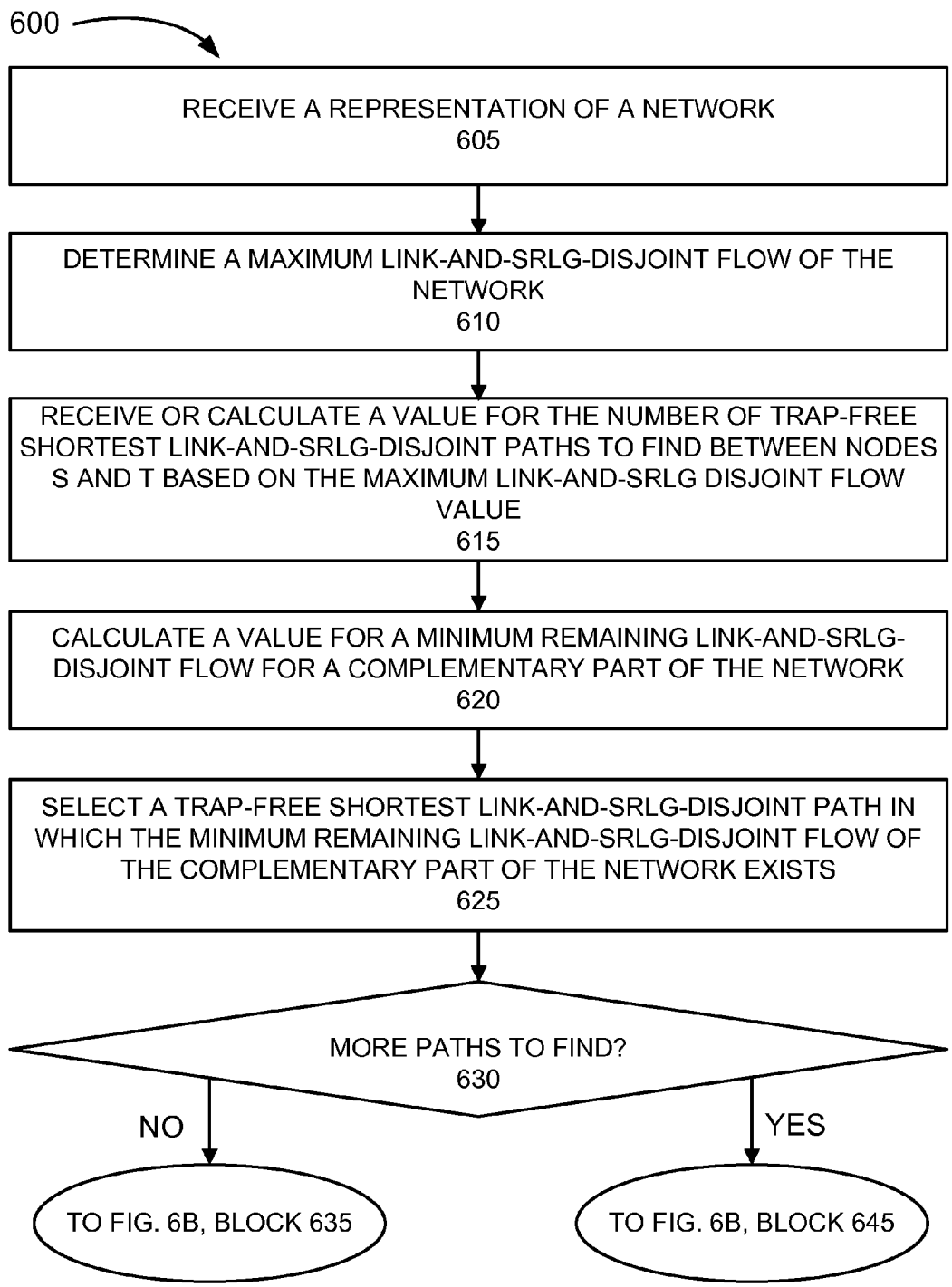
FIGS. 6A and 6B are flowcharts illustrating an exemplary process for selecting trap-free K shortest link-and-SRLG-disjoint paths and provisioning in a network.
Figure 6B:
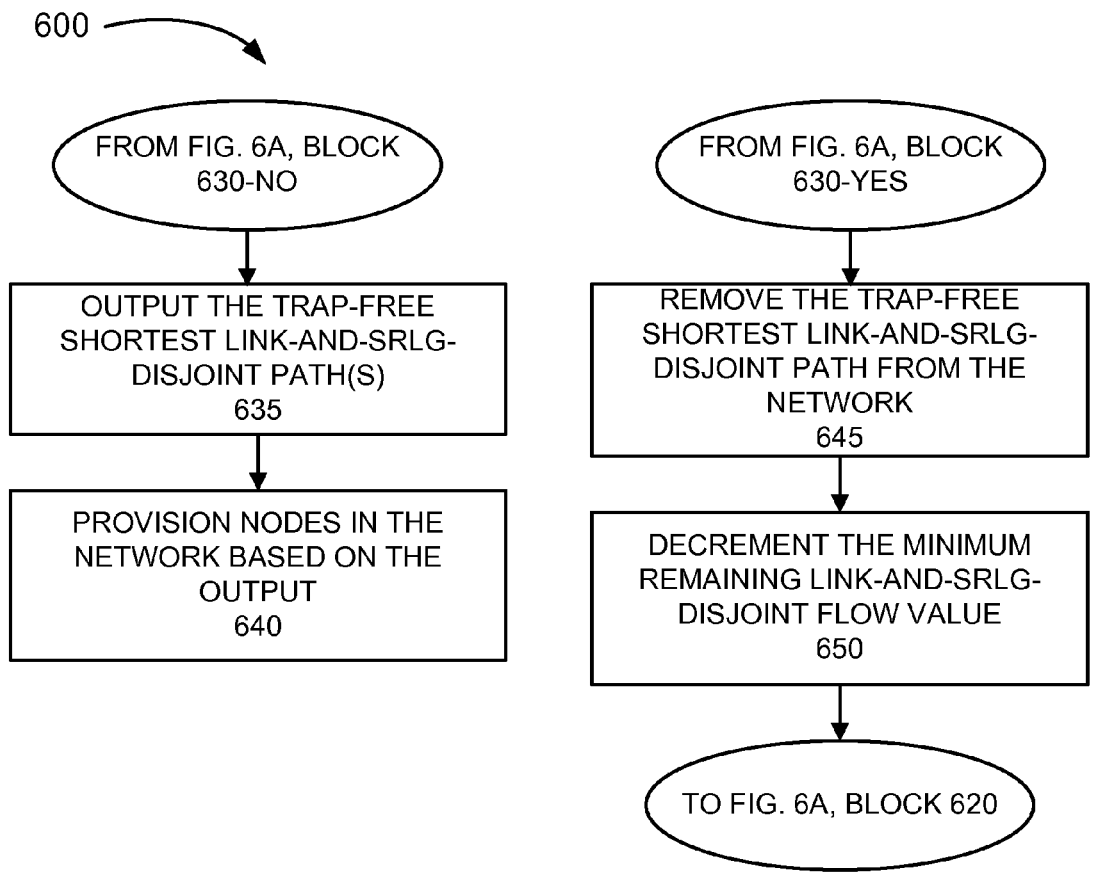

FIGS. 6A and 6B are flowcharts illustrating an exemplary process 600 for selecting K trap-free shortest link-and-SRLG-disjoint paths and provisioning in a network. According to an exemplary embodiment, process 600 may be performed by user device 120.

Process 600 may include receiving a representation of a network (block 605). For example, as previously described, user device 120 may receive information pertaining to a network that includes links and nodes. By way of example, the information may take the form of a network graph or some other type of information representative of the network (e.g., network G(N,L)). The network graph may include information pertaining to SRLGs.

A maximum link-and-SRLG-disjoint flow of the network may be determined (block 610). For example, as previously described, user device 120 may receive a value of the maximum link-and-SRLG-disjoint flow, expressed as $H_{s,t}^{MAX}(N,L)$, or may be ascertained by applying a brute force algorithm or some other appropriate algorithm to network G(N,L), in which the capacity of all links may be set to unity.

A value for the number of trap-free shortest link-and-SRLG-disjoint paths to find between node s and node t, which is based on the maximum link-and-SRLG-disjoint flow value, may be received or calculated (block 615). For example, as previously described, it may be assumed that $K \leq H_{s,t}^{MAX}(N,L)$ and K may represent the number of trap-free shortest link-and-SRLG-disjoint paths to find. This value may be selected by a user (e.g., a network administrator) or may be automatically selected based on the maximum link-and-SRLG-disjoint flow calculated.

A value for a minimum remaining link-and-SRLG-disjoint flow for a complementary part of the network may be calculated (block 620). For example, as previously described, f=K−k. So, for example, for the first trap-free shortest link-and-SRLG-disjoint path, f=K−1 units in the complementary network may be needed; for the second trap-free shortest link-and-SRLG-disjoint path, f=K−2 units in the complementary network may be needed; for the third trap-free shortest link-and-SRLG-disjoint path, f=K−3 units in the complementary network may be needed; etc.

A trap-free shortest link-and-SRLG-disjoint path in which the minimum remaining link-and-SRLG-disjoint flow of the complementary part of the network exists may be selected (block 625). For example, as previously described, until a convergence occurs (i.e., with respect to $\{E_{s,t}^{h}(i,f)|1\leq i\leq N\}$) the number of hops h may be incremented to find $j_{min}$ and determine a trap-free shortest link-and-SRLG-disjoint path from node s to node t.

It may be determined whether there are more link-and-SRLG-disjoint paths to find (block 630). For example, as previously described, K may represent the number of trap-free shortest link-and-SRLG-disjoint paths to find, which may decremented during each iteration of process 600.

If it is determined that there are no more link-and-SRLG-disjoint paths to find (block 630—NO), the selected trap-free shortest link-and-SRLG-disjoint path(s) may be output (block 635), as illustrated in FIG. 6B. For example, as previously described, user device 120 may output the trap-free shortest link-and-SRLG-disjoint path results to a user, to another device, etc., as a file(s) and/or other informational structure.

The nodes in the network may be provisioned based on the output (block 640). For example, as previously described, user device 120 or some other network management system may provision nodes 110 according to the determined trap-free K shortest link-and-SRLG-disjoint paths. In this case, the provisioned nodes may carry traffic according to the trap-free K shortest link-and-SRLG-disjoint paths.

Referring back to FIG. 6A, if it is determined that there are more link-and-SRLG disjoint paths to find (block 630—YES), the trap-free shortest link-and-SRLG-disjoint path and links in SRLG associated with the trap-free shortest link-and-SRLG-disjoint path may be removed from the network (block 645), as illustrated in FIG. 6B. For example, the links in $Q_{s,t}^{h}(t,f)$ and $SRLG(Q_{s,t}^{h}(t,f))$ may be removed from the network graph (i.e., $L=L-Q_{s,t}^{h}(i,f)-SRLG(Q_{s,t}^{h}(i,f))$). Process 600 may continue by decrementing the minimum remaining link-and-SRLG-disjoint flow value and returning to block 620 of FIG. 6A (block 650). For example, the minimum remaining flow f=K−k may be decreased and a selection of another trap-free shortest link-and-SRLG-disjoint path may be performed.

Although FIGS. 6A and 6B illustrate an exemplary process 600 for selecting trap-free shortest link-and-SRLG-disjoint paths and provisioning in a network, according to other implementations, process 600 may include additional operations, fewer operations, and/or different operations than those illustrated in FIGS. 6A and 6B and described herein.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/ or" is intended to be interpreted to include any and all combinations of one or more of the associated items.

In addition, while a series of blocks is described with regard to the process illustrated in FIGS. 6A and 6B, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 205, etc.), a combination of hardware and software (e.g., applications 215), a combination of hardware and firmware, or a combination of hardware, software, and firmware. The implementation of software or firmware has been described without reference to the specific software code since software can be designed to implement the embodiments based on the description herein. Additionally, a non-transitory storage medium may store instructions, which when executed, may perform processes and/or functions pertaining to the exemplary embodiments described herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, operation, or instruction described in the present application should be construed as critical or essential to the embodiments described herein unless explicitly described as such.

What is claimed is:

1. A method comprising:
   receiving network graph information of a network, wherein the network graph information includes shared risk link group (SRLG) information;
   determining a maximum link-and-SRLG-disjoint flow value of the network based on the network graph information;
   selecting a value for a number of trap-free shortest link-and-SRLG-disjoint paths to find between a source node and a destination node based on the maximum link-and-SRLG-disjoint flow value;
   selecting a minimum remaining link-and-SRLG-disjoint flow value based on the value for the number of trap-free shortest link-and-SRLG-disjoint paths; and
   selecting a trap-free shortest link-and-SRLG-disjoint path in which a complementary part of the network supports at least the minimum remaining link-and-SRLG-disjoint-flow value.

2. The method of claim 1, further comprising:
   removing the trap-free shortest link-and-SRLG-disjoint path and links in SRLG associated with the trap-free shortest link-and-SRLG-disjoint path from the network graph information;
   decrementing the value for the number of trap-free shortest link-and-SRLG-disjoint paths to find;
   decrementing the value for the minimum remaining link-and-SRLG-disjoint flow value; and
   selecting another trap-free shortest link-and-SRLG-disjoint path.

3. The method of claim 2, further comprising:
   recursively performing the removing, the decrementing the value for the number of trap-free shortest link-and-SRLG-disjoint paths, the decrementing the value for the minimum remaining link-and-SRLG-disjoint flow, and the selecting another trap-free shortest link-and-SRLG-disjoint path until the value for the number of trap-free shortest link-and-SRLG-disjoint paths is reached.

4. The method of claim 1, further comprising:
   provisioning the selected trap-free shortest link-and-SRLG-disjoint path in the network.

5. The method of claim 1, wherein the selecting the trap-free shortest link-and-SRLG-disjoint path comprises:
   incrementing a number of hops from the source node to select an intermediate node along a candidate trap-free shortest link-and-SRLG-disjoint path; and
   determining when a total length of a set of links in the candidate trap-free shortest link-and-SRLG-disjoint path converges.

6. The method of claim 1, wherein the selecting the trap-free shortest link-and-SRLG-disjoint path comprises:
   determining whether the complementary part of the network supports at least the minimum remaining link-and-SRLG-disjoint flow value relative to a candidate trap-free shortest link-and-SRLG-disjoint path from the source node to the destination node.

7. The method of claim 1, wherein the selecting the trap-free shortest link-and-SRLG-disjoint path comprises:
   selecting a candidate node associated with a partial candidate trap-free shortest link-and SRLG-disjoint path from the source node to the destination node; and
   determining whether the complementary part of the network supports at least the minimum remaining link-and-SRLG-disjoint flow value.

8. The method of claim 7, further comprising:
   selecting another candidate node associated with a partial candidate trap-free shortest link-and SRLG-disjoint path from the source node to the destination node; and
   determining whether the complementary part of the network supports at least the minimum remaining link-and-SRLG-disjoint flow value.

9. A device comprising:
   a processor; and
   a memory including instructions, which when executed, cause the processor to:
   receive network topology information pertaining to a network;
   determine a maximum link-and-shared risk link group (SRLG)-disjoint flow value of the network based on the network topology information;
   select a value for a number of trap-free shortest link-and-SRLG-disjoint paths to find between a source node and a destination node based on the maximum link-and-SRLG-disjoint flow value;

select a minimum remaining link-and-SRLG-disjoint flow value based on the value for the number of trap-free shortest link-and-SRLG-disjoint paths; and select a trap-free shortest link-and-SRLG-disjoint path in which a complementary part of the network supports at least the minimum remaining link-and-SRLG-disjoint flow value.

10. The device of claim 9, wherein the processor executes the instructions and is further configured to:

remove the trap-free shortest link-and-SRLG-disjoint path and links in SRLG associated with the trap-free shortest link-and-SRLG-disjoint path from the network topology information;

decrement the value for the number of trap-free shortest link-and-SRLG-disjoint paths to find;

decrement the value for the minimum remaining link-and-SRLG-disjoint flow value; and select another trap-free shortest link-and-SRLG-disjoint path.

11. The device of claim 10, wherein the processor executes the instructions and is further configured to:

recursively perform the removing, the decrementing the value for the number of trap-free shortest link-and-SRLG-disjoint paths, the decrementing the value for the minimum remaining link-and-SRLG-disjoint flow, and the selecting another trap-free shortest link-and-SRLG-disjoint path until the value for the number of trap-free shortest link-and-SRLG-disjoint paths is reached.

12. The device of claim 11, wherein when selecting the trap-free shortest link-and-SRLG-disjoint path, the processor is further configured to:

determine whether the complementary part of the network supports at least the minimum remaining link-and-SRLG-disjoint flow value relative to a candidate trap-free shortest link-and-SRLG-disjoint path from the source node to the destination node.

13. The device of claim 12, wherein when determining whether the complimentary part of the network supports at least the minimum remaining link-and-SRLG-disjoint flow, the processor executes the instructions and is further configured to:

calculate a flow value based on a set of links associated with a shortest path from the source node to a candidate node and a SRLG associated with the shortest path.

14. The device of claim 11, wherein when selecting the trap-free shortest link-and-SRLG-disjoint path, the processor is further configured to:

select a candidate node associated with a partial candidate trap-free shortest link-and-SRLG-disjoint path from the source node to the destination node; and determine whether the complementary part of the network supports at least the minimum remaining link-and-SRLG-disjoint flow value.

15. The device of claim 11, wherein the network is a mesh network.

16. A non-transitory storage medium storing instructions executable by a computational device for:

receiving network topology information of a network;

determining a maximum link-and-shared risk link group (SRLG)-disjoint flow value of the network based on the network topology information;

selecting a source node and a destination node in which to find one or more trap-free shortest link-and-SRLG-disjoint paths;

selecting a value for a minimum remaining link-and-SRLG-disjoint flow value; and selecting one or more trap-free shortest link-disjoint paths from the source node to the destination node in which a complementary part of the network supports at least the minimum remaining link-and-SRLG-disjoint flow value with respect to each selected trap-free shortest link-and-SRLG-disjoint path.

17. The non-transitory storage medium of claim 16, wherein the instructions for selecting the one or more trap-free shortest link-and-SRLG-disjoint paths comprises further instructions for:

determining whether the complementary part of the network supports at least the minimum remaining link-and-SRLG-disjoint flow value relative to a candidate trap-free shortest link-and-SRLG-disjoint path from the source node to the destination node.

18. The non-transitory storage medium of claim 16, wherein the instructions for selecting the one or more trap-free shortest link-and-SRLG-disjoint paths comprises further instructions for:

incrementing a number of hops from the source node to select an intermediate node along a candidate trap-free shortest link-and-SRLG-disjoint path; and determining when a total length of a set of links in the candidate trap-free shortest link-and-SRLG-disjoint path converges.

19. The non-transitory storage medium of claim 16, wherein the instructions for selecting the one or more trap-free shortest link-and-SRLG-disjoint paths comprises further instructions for:

decrementing the value for the minimum remaining link-and-SRLG-disjoint flow value as each trap-free shortest link-and-SRLG-disjoint path is selected.

20. The non-transitory storage medium of claim 16, storing further instructions for:

selecting a candidate node associated with a partial candidate trap-free shortest link-and SRLG-disjoint path from the source node to the destination node.

* * * * *